United States Patent
Yamashita et al.

(10) Patent No.: US 11,757,175 B2
(45) Date of Patent: Sep. 12, 2023

(54) STRADDLE TYPE VEHICLE

(71) Applicant: HONDA MOTOR CO., LTD., Tokyo (JP)

(72) Inventors: Naoto Yamashita, Wako (JP); Futoshi Koga, Wako (JP); Yoshiyuki Kuroba, Wako (JP); Hiroshi Maeda, Wako (JP); Akihito Kawamura, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 546 days.

(21) Appl. No.: 17/096,938

(22) Filed: Nov. 12, 2020

(65) Prior Publication Data

US 2021/0061391 A1    Mar. 4, 2021

Related U.S. Application Data

(63) Continuation of application No. PCT/JP2018/019897, filed on May 23, 2018.

(51) Int. Cl.
*H01Q 1/32* (2006.01)
*B60R 13/10* (2006.01)
(Continued)

(52) U.S. Cl.
CPC ......... *H01Q 1/3233* (2013.01); *B60R 13/105* (2013.01); *B62J 1/28* (2013.01);
(Continued)

(58) Field of Classification Search
CPC .......... G01S 7/02; G01S 7/0236; G01S 13/88; G01S 13/931; G01S 2013/93271;
(Continued)

(56) References Cited

U.S. PATENT DOCUMENTS 9,434,436 B1    9/2016 Tanabe
9,893,415 B2    2/2018 Hashimoto
(Continued)

FOREIGN PATENT DOCUMENTS

DE    102011002894 A1    7/2012
DE    102013222598 A1    5/2015
(Continued)

OTHER PUBLICATIONS

International Search Report and Written Opinion for PCT/JP2018/019897 dated Aug. 14, 2018.
(Continued)

*Primary Examiner* — Jason D Shanske
*Assistant Examiner* — Daniel M. Keck
(74) *Attorney, Agent, or Firm* — Thomas| Horstemeyer, LLP

(57) ABSTRACT

A straddle type vehicle comprising a rear fender arranged on an upper side of a rear wheel, and a monitoring device configured to monitor a traveling environment on the periphery of a vehicle, wherein the monitoring device includes a pair of sensors, the rear fender includes a sensor support member configured to support one of the pair of sensors on a left side of a vehicle body and the other on a right side of the vehicle body, the sensor support member includes a pair of left and right side wall portions, and a bottom wall portion configured to connect the pair of left and right side wall portions, and the pair of sensors are arranged along the pair of left and right side wall portions on the bottom wall portion.

20 Claims, 7 Drawing Sheets

(51) Int. Cl.

| | | |
|---|---|---|
| *B62J 1/28* | (2006.01) | |
| *B62J 15/00* | (2006.01) | |
| *G01S 13/88* | (2006.01) | |
| *B62K 11/02* | (2006.01) | |
| *G01S 7/02* | (2006.01) | |
| *B62J 27/00* | (2020.01) | |

(52) U.S. Cl.
CPC ............... *B62J 15/00* (2013.01); *B62J 27/00* (2013.01); *B62K 11/02* (2013.01); *G01S 7/02* (2013.01); *G01S 13/88* (2013.01); *H01Q 1/325* (2013.01)

(58) Field of Classification Search
CPC . G01S 2013/93272; G01S 2013/93274; G01S 17/931; H01Q 1/241; H01Q 1/3233; H01Q 1/325; H01Q 5/30; H01Q 21/28; H01Q 21/29; H01Q 25/00; B60R 13/105; B62J 1/28; B62J 15/00; B62J 27/00; B62K 11/02; B62K 11/04
See application file for complete search history.

(56) References Cited

U.S. PATENT DOCUMENTS

| | | |
|---|---|---|
| 10,054,455 B2 | 8/2018 | Asakura et al. |
| 2016/0013545 A1 | 1/2016 | Hashimoto |
| 2016/0043462 A1 * | 2/2016 | Moromoto ........... H01Q 1/3283 180/219 |
| 2016/0244118 A1 | 8/2016 | Tanabe |
| 2017/0010612 A1 | 1/2017 | Asakura et al. |
| 2017/0355300 A1 * | 12/2017 | Kurata ..................... B60Q 1/30 |
| 2022/0297783 A1 * | 9/2022 | Hirano ..................... B62J 27/00 |

FOREIGN PATENT DOCUMENTS

| | | | |
|---|---|---|---|
| EP | 2180545 A1 | 4/2010 | |
| EP | 3453600 A1 * | 3/2019 | ............ B62J 45/412 |
| JP | S61162777 A | 7/1986 | |
| JP | 2001-105973 A | 4/2001 | |
| JP | 2001-151016 A | 6/2001 | |
| JP | 2010116128 A | 5/2010 | |
| JP | 2010120628 A | 6/2010 | |
| JP | 2011102064 A | 5/2011 | |
| JP | 2015063196 A | 4/2015 | |
| JP | 2016078502 A | 5/2016 | |
| JP | 2016155476 A | 9/2016 | |
| JP | 2017019308 A | 1/2017 | |
| JP | 2017-039487 A | 2/2017 | |
| WO | 2014/136658 A1 | 9/2014 | |
| WO | 2019/224959 A1 | 11/2019 | |

OTHER PUBLICATIONS

German Office Action for German Patent Application No. 112018007647.4 dated Dec. 16, 2022 (partially translated).

* cited by examiner

STRADDLE TYPE VEHICLE

CROSS-REFERENCE TO RELATED APPLICATION(S)

This application is a continuation of International Patent Application No. PCT/JP2018/019897 filed on May 23, 2018, the entire disclosure of which is incorporated herein by reference.

BACKGROUND OF THE INVENTION

Technical Field

The present invention relates to a straddle type vehicle, and mainly, to a rear structure thereof.

Background Art

As an example of a four-wheeled vehicle, a vehicle capable of performing some or all of driving operations such as acceleration and braking on the side of an ECU (Electronic Control Unit), that is, performing driving support has been proposed (Japanese Patent Laid-Open No. 2017-19308). According to Japanese Patent Laid-Open No. 2017-19308, as monitoring devices configured to monitor the traveling environment of a four-wheeled vehicle, a plurality of driving support sensors, for example, radars, cameras, and the like are arranged around a vehicle body, and the driving support is performed based on the monitoring results of the devices.

Technical Problem

In general, it is difficult for a straddle type vehicle such as a motorcycle to ensure a space to arrange vehicle constituent components, and this also applies to the vehicle body rear structure (see Japanese Patent Laid-Open No. 2010-120628). For this reason, to apply an arrangement capable of driving support to a straddle type vehicle, how to install monitoring devices in the straddle type vehicle needs to be taken into consideration.

It is an object of the present invention to implement installation of a monitoring device in the vehicle body rear structure of a straddle type vehicle by a relatively simple arrangement.

SUMMARY OF THE INVENTION

An aspect of the present invention is related to a straddle type vehicle comprising a rear fender arranged on an upper side of a rear wheel, and a monitoring device configured to monitor a traveling environment on the periphery of a vehicle, wherein the monitoring device includes a pair of sensors, the rear fender includes a sensor support member configured to support one of the pair of sensors on a left side of a vehicle body and the other on a right side of the vehicle body, the sensor support member includes a pair of left and right side wall portions, and a bottom wall portion configured to connect the pair of left and right side wall portions, and the pair of sensors are arranged along the pair of left and right side wall portions on the bottom wall portion.

Advantageous Effects of Invention

According to the present invention, it is possible to appropriately install a monitoring device in the vehicle body rear structure of a straddle type vehicle.

DESCRIPTION OF THE EMBODIMENTS

Figure 1:
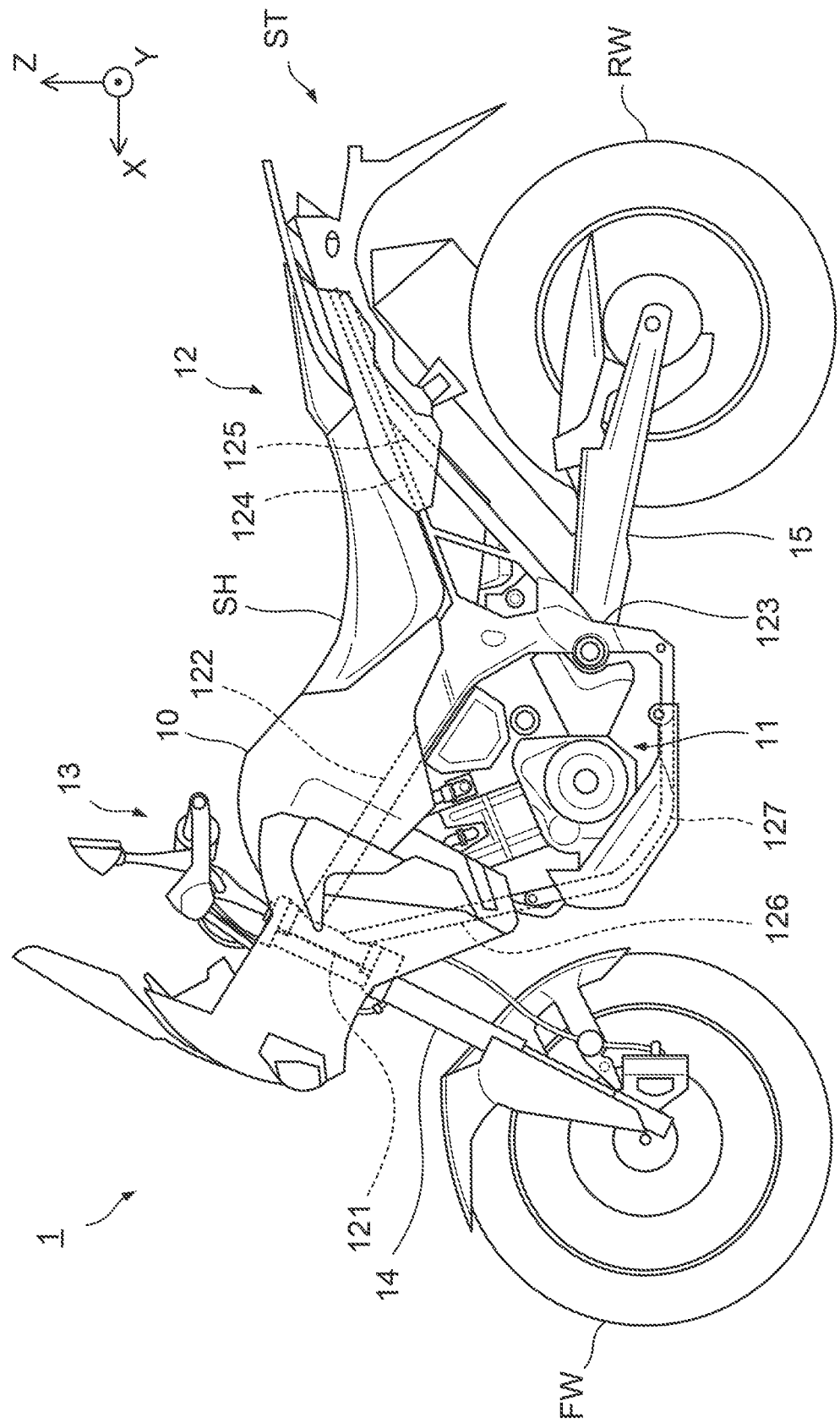
FIG. 1 is a right side view for explaining an example of the arrangement of a straddle type vehicle according to the embodiment.

Embodiments of the present invention will now be described with reference to the accompanying drawings. Note that the drawings are schematic views showing structures or arrangements according to the embodiments, and the dimensions of members shown in the drawings do not necessarily reflect the actuality. In the drawings, the same reference numerals denote the same members or the same constituent elements, and a description of repetitive contents will be omitted hereinafter.

Figure 2:
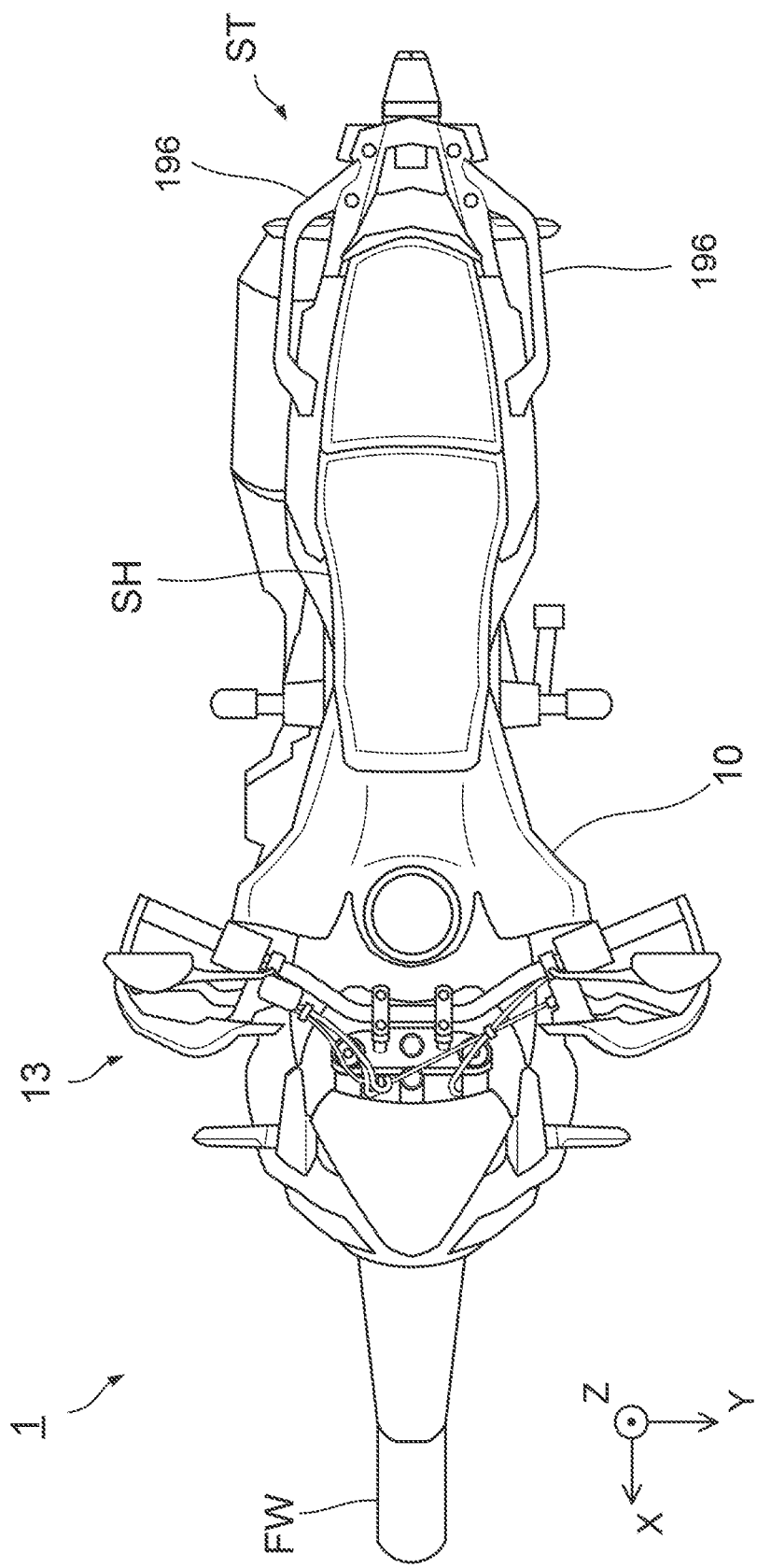
FIG. 2 is a top view (plan view) for explaining an example of the arrangement of the straddle type vehicle.

FIG. 1 is a right side view of a straddle type vehicle 1 according to the embodiment. FIG. 2 is a top view (plan view) of the straddle type vehicle 1. For easy understanding of the structure, FIG. 1 shows an X-axis, a Y-axis, and a Z-axis, which are orthogonal to each other (this also applies to other drawings to be described later). The X direction corresponds to the front-and-rear direction of the vehicle body, the Y direction corresponds to the vehicle width direction or the left-and-right direction of the vehicle body, and the Z direction corresponds to the vertical direction of the vehicle body. In this specification, expressions "front/rear", "left/right (lateral)", "upper/lower", and the like represent relative positional relationships with respect to the vehicle body. For example, expressions "front", "front side" and the like correspond to the +X direction, and expressions "rear", "rear side" and the like correspond to the −X direction. In addition, a direction parallel to both the X direction and the Y direction is defined as a horizontal direction.

The straddle type vehicle 1 is a type of vehicle that a rider (driver) drives while straddling a vehicle body 10 and, in this embodiment, is a motorcycle including a seat SH on which the rider can sit, a front wheel FW, and a rear wheel RW. The straddle type vehicle 1 further includes a power unit 11, a vehicle body frame 12, an operation mechanism 13, a front fork 14, and a swing arm 15. The power unit 11 generates power (rotation) to drive the rear wheel RW that is a driving wheel in this embodiment. As an example of the power unit 11, an internal combustion engine (engine) is used. As another example, an electric motor such as a 3-phase induction motor may be used. The straddle type vehicle 1 can further comprise a transmission configured to shift the power of the power unit 11, although a detailed description thereof will be omitted here.

The vehicle body frame 12 includes a head pipe 121, a main frame 122, a pivot frame 123, a seat frame 124, a rear frame 125, a down frame 126, and a lower frame 127. The head pipe 121 pivotally supports a handle bar on which the operation mechanism 13 including a brake lever, a turn signal switch, and the like is provided. A pair of left and right front forks 14 are provided to rotatably support the front wheel FW. The rider makes the handle bar pivot, thereby changing the direction of the front wheel FW that is a steering wheel via the front forks 14 and performing a steering operation.

The main frame 122 is extended from the head pipe 121 to the rear side of the vehicle body. The pivot frame 123 is extended from the rear portion of the main frame 122 to the lower side of the vehicle body. The swing arm 15 rotatably supports the rear wheel RW, and is swingably supported by the pivot frame 123.

The seat frame 124 is extended from the rear portion of the main frame 122 to the rear side of the vehicle body to support a load applied to the seat SH. The rear frame 125 is extended from the pivot frame 123 to the rear side of the vehicle body to support a load applied to the seat SH together with the seat frame 124. Note that a predetermined reenforcing member (truss frame) may be disposed across the seat frame 124 and the rear frame 125 to improve their strength.

In this embodiment, the down frame 126 is extended from the head pipe 121 to the lower rear side. As another embodiment, the down frame 126 may be extended from the upper end portion of the main frame 122 to the lower rear side. Note that a predetermined reenforcing member may be disposed across the main frame 122 and the down frame 126 to improve their strength. The lower frame 127 is extended from the lower portion of the down frame 126 to the rear side (up to the pivot frame 123).

Although not illustrated in FIG. 1 that is a side view, the main frame 122, the pivot frame 123, the seat frame 124, the rear frame 125, the down frame 126, and the lower frame 127 each include a pair to left and right frames. With this arrangement, individual vehicle constituent components in the vehicle body 10 can be fixed to corresponding parts of the above-described vehicle body frame 12 and held in the vehicle body 10. For example, the power unit 11 can be held between the pair of left and right main frames 122 in a planar view (from the viewpoint in the Z direction) and between the main frame 122, the pivot frame 123, the down frame 126, and the lower frame 127 in a side view (from the viewpoint in the Y direction).

As shown in FIG. 2, a grab rail 196 is provided in the rear portion of the vehicle body 10. An occupant who sits together with the rider on the seat SH behind the rider can grip the grab rail 196.

A vehicle body rear structure ST in the above-described straddle type vehicle 1 will be described below with reference to FIGS. 3A to 5B. Here, the vehicle body rear structure ST indicates the structure of the vehicle body rear portion, for example, the structure of a portion that overlaps the rear wheel RW and a portion on the rear side of that portion and, additionally, the peripheral portion thereof in the straddle type vehicle 1 in a planar view.

Figure 3A:
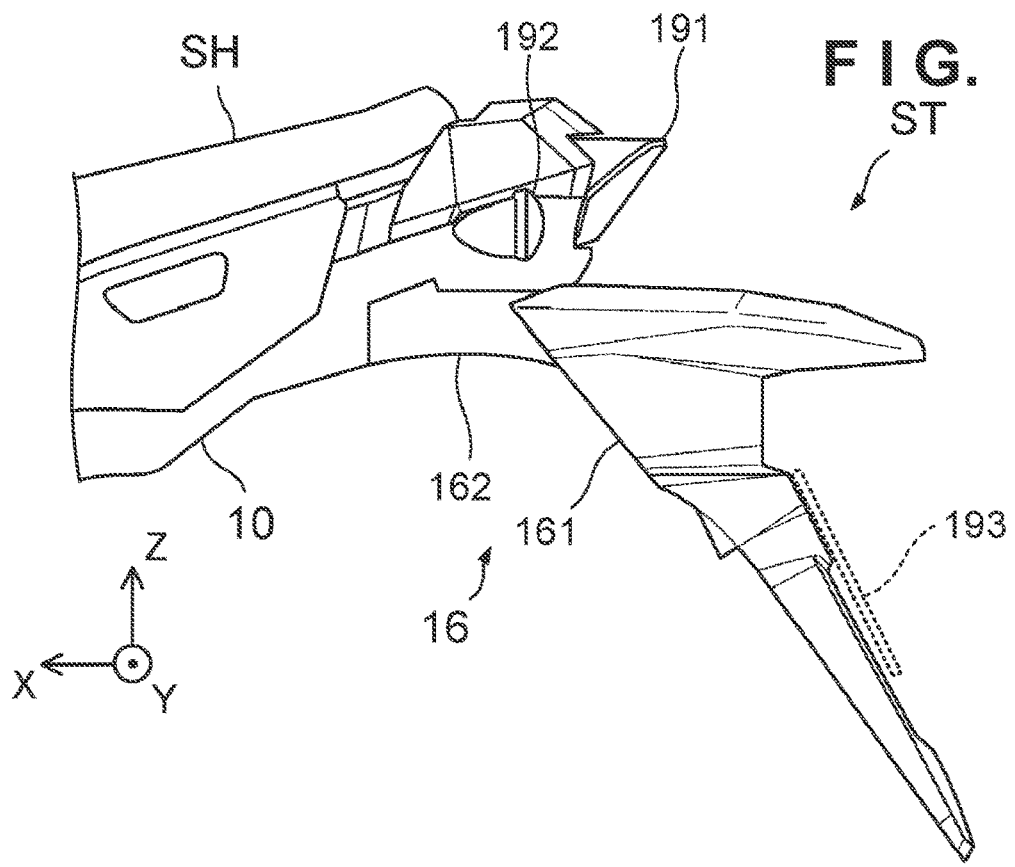
FIG. 3A is a right side view for explaining the vehicle body rear structure of the straddle type vehicle.
Figure 3B:
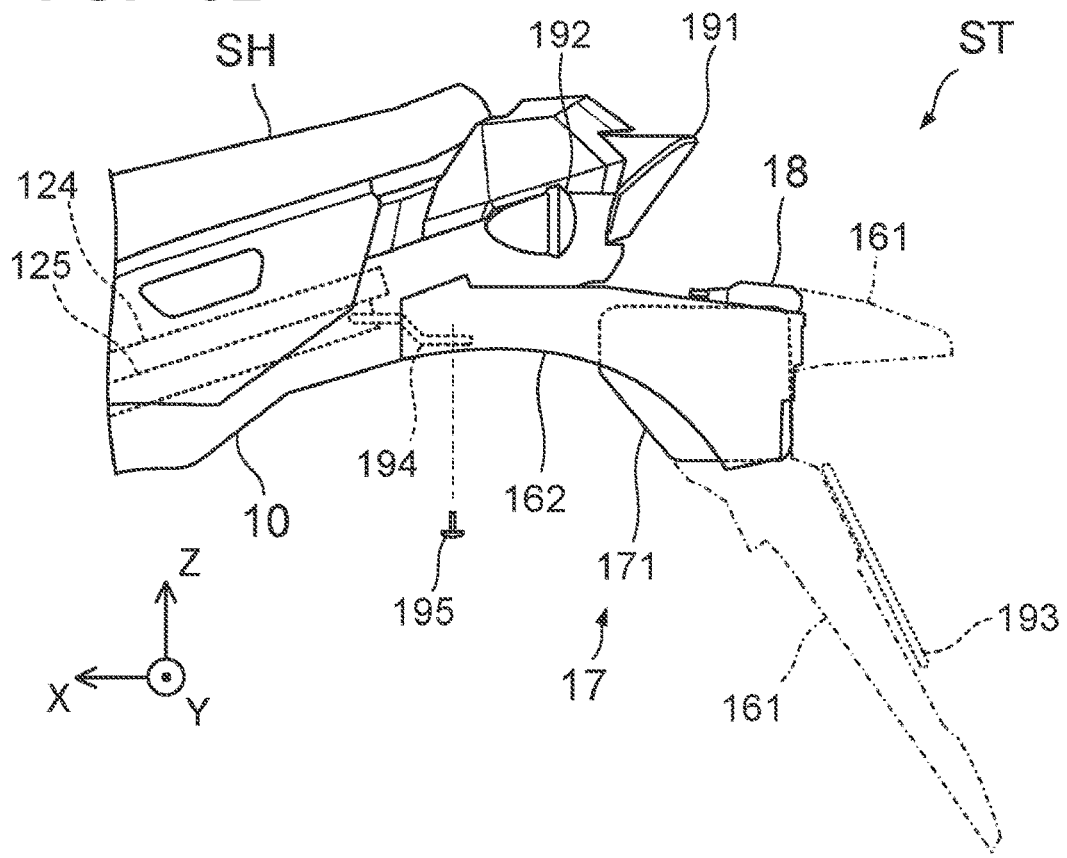
FIG. 3B is a right side view for explaining the vehicle body rear structure of the straddle type vehicle.
Figure 4A:
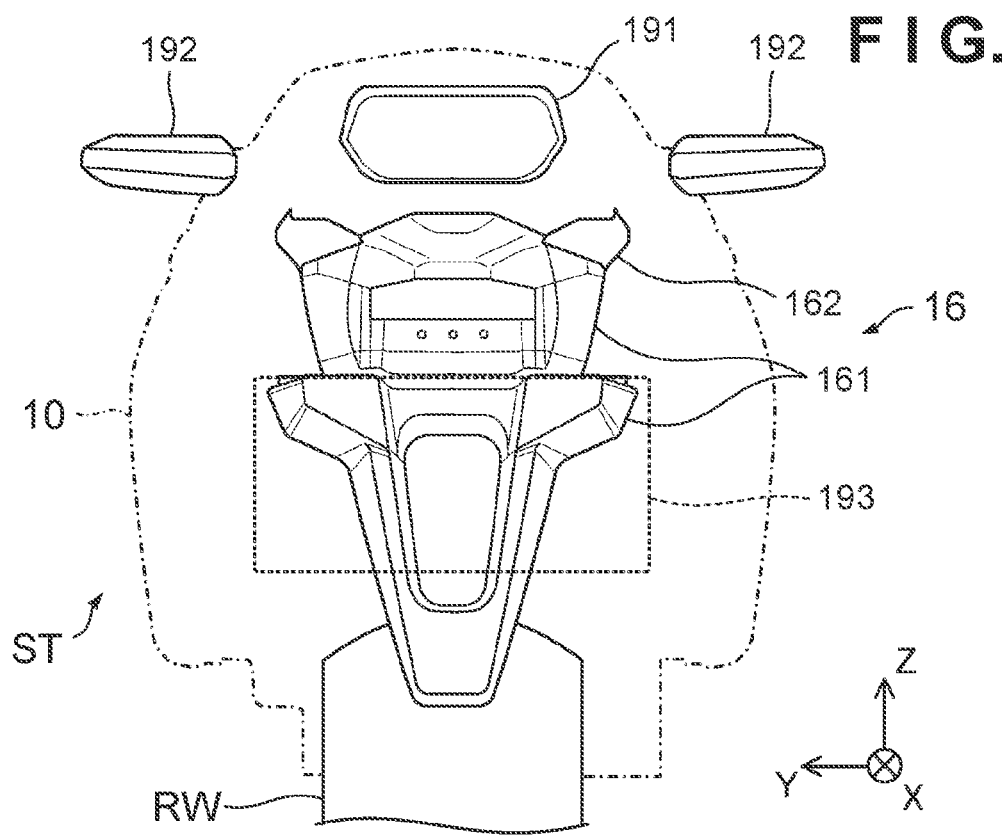
FIG. 4A is a back view for explaining the vehicle body rear structure of the straddle type vehicle.
Figure 4B:
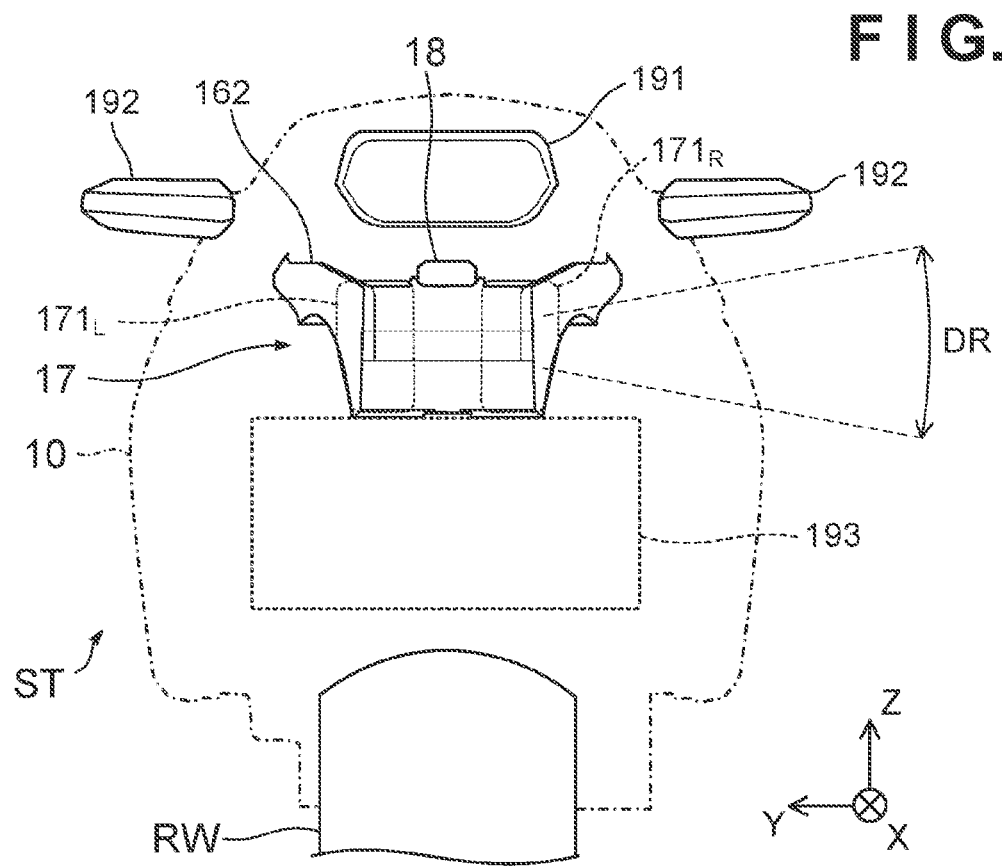
FIG. 4B is a back view for explaining the vehicle body rear structure of the straddle type vehicle.
Figure 5A:
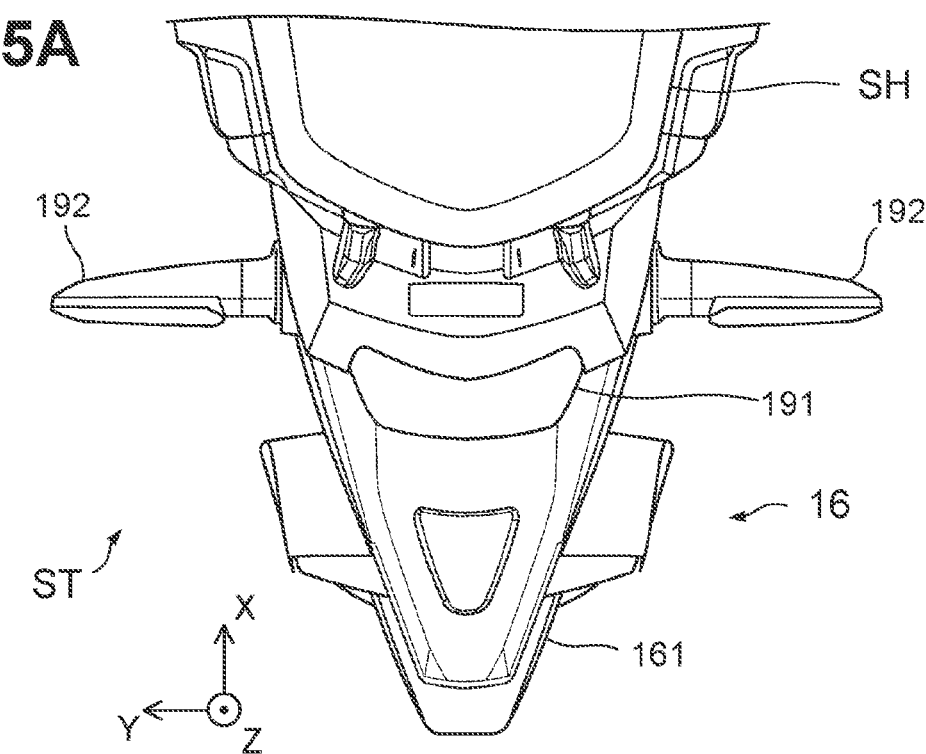
FIG. 5A is a top view for explaining the vehicle body rear structure of the straddle type vehicle.
Figure 5B:
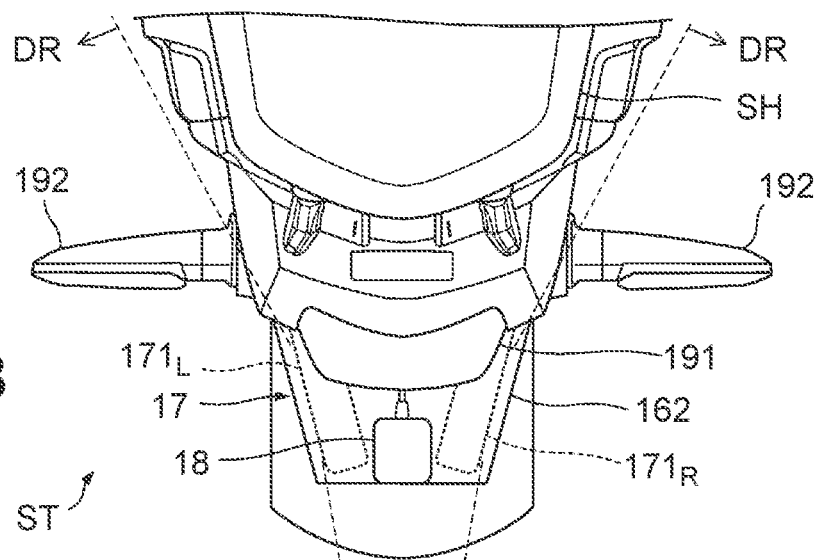
FIG. 5B is a top view for explaining the vehicle body rear structure of the straddle type vehicle.

FIG. 3A is a right side view of the vehicle body rear structure ST, and FIG. 3B is a right side view for explaining a part of the structure ST. FIG. 4A is a back view of the structure ST, and FIG. 4B is a back view for explaining a part of the structure ST (note that to facilitate understanding of the drawings, the outline of the vehicle body 10 is indicated by an alternate long and short dashed line). FIG. 5A is a top view of the structure ST, and FIG. 5B is a top view for explaining a part of the structure ST.

In the rear portion of the vehicle body, the straddle type vehicle 1 further includes a rear fender 16, a tail light 191, and turn signals (direction indicators) 192. The rear fender 16 is arranged on the upper side of the rear wheel RW (see FIG. 1) and on the lower side of the tail light 191 and the turn signals 192. In this embodiment, the rear fender 16 is made of a resin, and includes a cover member 161 and a sensor support member 162.

The cover member 161 is provided on the upper side of the rear wheel RW to cover the rear wheel RW. The cover member 161 functions as a fender main body, and shields mud, water, and the like splashed as the rear wheel RW rotates. In addition, a license plate 193 is attached to the lower rear portion of the cover member 161.

The sensor support member 162 is configured to support (or hold) a sensor to be described later, and also functions as a fender base portion configured to fix the cover member 161 to the rear end portion of the vehicle body 10. That is, the sensor support member 162 extends backward from the rear portion of the vehicle body to support the sensor, and also fixes the cover member 161 at the rear end portion.

Note that FIGS. 3B, 4B, and 5B are shown mainly to omit illustration of the cover member 161 in FIGS. 3A, 4A, and 5A.

As a monitoring device 17 configured to monitor the traveling environment on the periphery of the vehicle, the straddle type vehicle 1 further includes a plurality of driving support sensors (ADAS (Advanced Driver Assistance System) sensors). Examples of the driving support sensor are a radar (millimeter wave radar) and a camera (an image capturing device using a CCD image sensor, a CMOS image sensor, or the like). As another example of the driving support sensor, a LiDAR (Light Detection And Ranging, a laser radar), a sonar (ultrasonic sensor), or the like may be used.

Examples of the traveling environment obtained by the monitoring device 17 are the presence/absence of a predetermined object such as a pedestrian, another vehicle, or an obstacle on the periphery of the straddle type vehicle 1, and the extending direction of a road to travel. Although a detailed description will be omitted here, the straddle type vehicle 1 further includes an ECU (Electronic Control Unit) including a CPU and a memory, and performs driving support based on the traveling environment obtained by the monitoring device 17. Driving support means that the ECU performs some or all of driving operations such as acceleration and braking in place of the rider, and examples are vehicle speed maintaining traveling control (adaptive cruise control (ACC)), and lane maintaining traveling control (lane keep assist (LKAS)).

The plurality of driving support sensors serving as the monitoring device 17 are arranged at positions in the vehicle body 10 and also arranged in the rear portion of the vehicle body. As shown in FIGS. 3B, 4B, and 5B, in this embodiment, the monitoring device 17 includes a pair of left and right radars 171, and the pair of radars 171 are supported by the sensor support member 162. Note that for the sake of distinction, of the pair of radars 171, one on the left side of the vehicle body will be referred to as a "radar $171_L$" and the other on the right side of the vehicle body will be referred to as a "radar $171_R$. These will simply be expressed as the radars 171 if they are not particularly discriminated.

As shown in FIGS. 3B, 4B, and 5B, the straddle type vehicle 1 further includes an external communication antenna 18. The external communication antenna 18 is used by the straddle type vehicle 1 to perform external communication such as inter-vehicle communication or vehicle-to-infrastructure communication, and is used to use, for example, a C-ITS (Cooperative Intelligent Transport System). For example, the above-described ECU or another ECU can perform external communication using the external communication antenna 18 and provide traffic congestion information or propose a recommended traveling route to the rider based on the result.

As an example of the external communication antenna 18, an antenna of various shapes such as a pole type or a fin type can be used. To prevent or reduce electromagnetic interferences, the external communication antenna 18 is preferably arranged apart from the above-described radars 171 or another driving support sensor. In this embodiment, the external communication antenna 18 is arranged on the sensor support member 162 and located on the upper side of the radars 171.

As shown in FIG. 3B, the rear fender 16 is fixed to the rear portion or rear end portion of the vehicle body frame 12 by a rear fender stay 194. In this embodiment, the rear fender stay 194 is fixed at one end portion to the rear end portion of the rear frame 125, and the sensor support member 162 is fixed at the other end portion. As another embodiment, the one end portion of the rear fender stay 194 may alternatively/additionally be fixed to the rear end portion of the seat frame 124. Fixing of the rear fender stay 194 and the vehicle body frame 12 can be implemented by either welding or fastening. In this embodiment, fixing of the rear fender stay 194 and the sensor support member 162 is be implemented by a fastening member 195 (for example, a screw).

According to the above-described fixing aspect of the rear fender 16, the radars 171 are arranged on the rear side of the rear fender stay 194. For this reason, the radars 171 are arranged relatively on the rear side of the vehicle body 10, and direction ranges (detection ranges) DR thereof are not impeded by vehicle constituent components such as the tail light 191 and the turn signals 192. Hence, the direction ranges DR of the radars 171 can appropriately be ensured.

In addition, if a metal component exists in the direction range DR of the radar 171, detection by the radar 171 may not appropriately be implemented. As described above, the license plate 193 is attached to the lower rear portion of the cover member 161. In many case, the license plate 193 is made of a metal. For this reason, as shown in FIG. 4B, the radars 171 are preferably fixed on the upper side of the license plate 193. Additionally, the radars 171 are preferably fixed in a posture in which the direction ranges DR face in the horizontal direction. According to these fixing aspects, the license plate 193 can be prevented from being located in the direction ranges DR of the radars 171, and detection by the radars 171 is not impeded.

Note that in general, a millimeter wave emitted by the radar 171 can pass a resin member. The millimeter wave can pass a relatively thin resin member without substantially causing an intensity loss.

As shown in FIG. 5B, the pair of left and right radars $171_L$ and $171_R$ are preferably installed such that at least parts of the direction ranges DR overlap on the rear side of the vehicle body. In this embodiment, in a planar view, the radars $171_L$ and $171_R$ are fixed in a tilting posture such that the direction ranges DR face the outer side in the vehicle width direction and slightly the rear side. Accordingly, the direction ranges DR of the radars $171_L$ and $171_R$ overlap each other on the rear side of the vehicle body, and it is possible to appropriately monitor the traveling environment behind the vehicle body without forming a blind spot in the monitoring range on the rear side of the vehicle body.

As is apparent from FIGS. 3A and 3B, the cover member 161 preferably covers the sensor support member 162 such that the pair of radars 171 overlap both the sensor support member 162 and the cover member 161 in a side view. This can protect the radars 171 from an external impact. Note that this also applies to any other driving support sensor.

Figure 6:
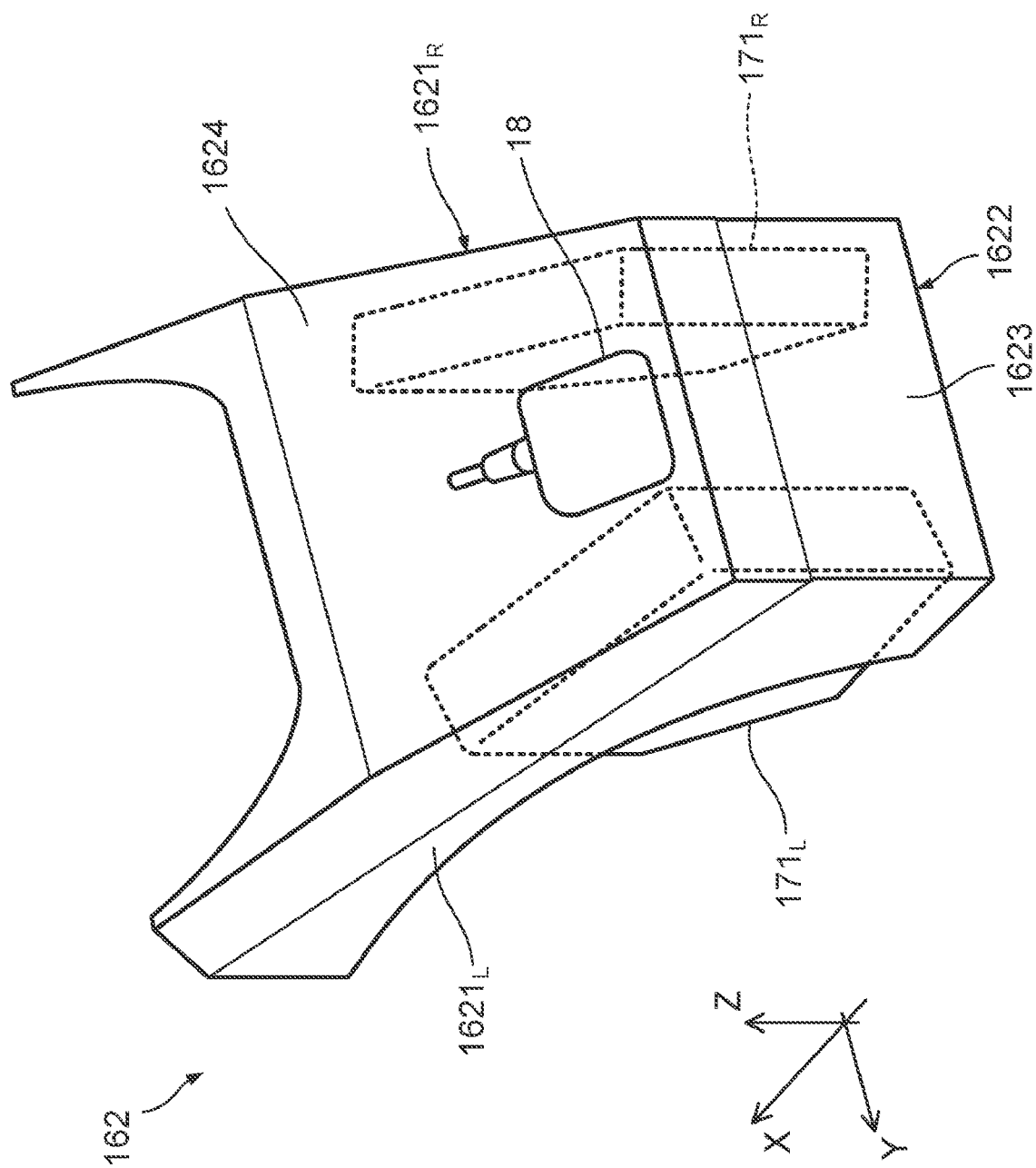
FIG. 6 is a perspective view for explaining a part of the structure of a rear fender.

FIG. 6 shows a perspective view of the sensor support member 162 together with the radars 171 and the external communication antenna 18. The sensor support member 162 is formed into a box shape or a frame shape to support the driving support sensors (the radars 171 in this embodiment) and, in this embodiment, includes a pair of left and right side wall portions $1621_L$ and $1621_R$, a bottom wall portion 1622, a rear wall portion 1623, and an upper wall portion 1624.

The side wall portions $1621_L$ and $1621_R$ face each other such that the distance between them becomes short toward the rear portion of the vehicle body. The bottom wall portion 1622 is located between the side wall portions $1621_L$ and $1621_R$ in a planar view to connect the side wall portions $1621_L$ and $1621_R$, and forms the lower portion of the sensor support member 162. The rear wall portion 1623 is located between the side wall portions $1621_L$ and $1621_R$ in a front view or a back view (from the viewpoint in the X direction) to connect the side wall portions $1621_L$ and $1621_R$, and forms the rear portion of the sensor support member 162. The upper wall portion 1624 is located between the side wall portions $1621_L$ and $1621_R$ in a planar view to connect the side wall portions $1621_L$ and $1621_R$, and forms the upper portion of the sensor support member 162.

The pair of radars 171 are arranged along the pair of side wall portions $1621_L$ and $1621_R$ on the bottom wall portion 1622. Since the side wall portions $1621_L$ and $1621_R$ face each other such that the distance between them becomes short toward the rear portion of the vehicle body, the pair of radars 171 are installed in a tilting posture in a planar view, and their direction ranges DR overlap on the rear side of the vehicle body, as described above with reference to FIG. 5B.

The external communication antenna 18 is installed on the upper wall portion 1624. In this embodiment, the external communication antenna 18 is installed at the center of the upper surface of the upper wall portion 1624, and located between the pair of radars 171 in a planar view and on the upper side of the pair of the radars 171 in a side view. According to this installation aspect, it is possible to suppress or reduce the electromagnetic interference of the external communication antenna 18 with the radars 171.

Figure 7A:
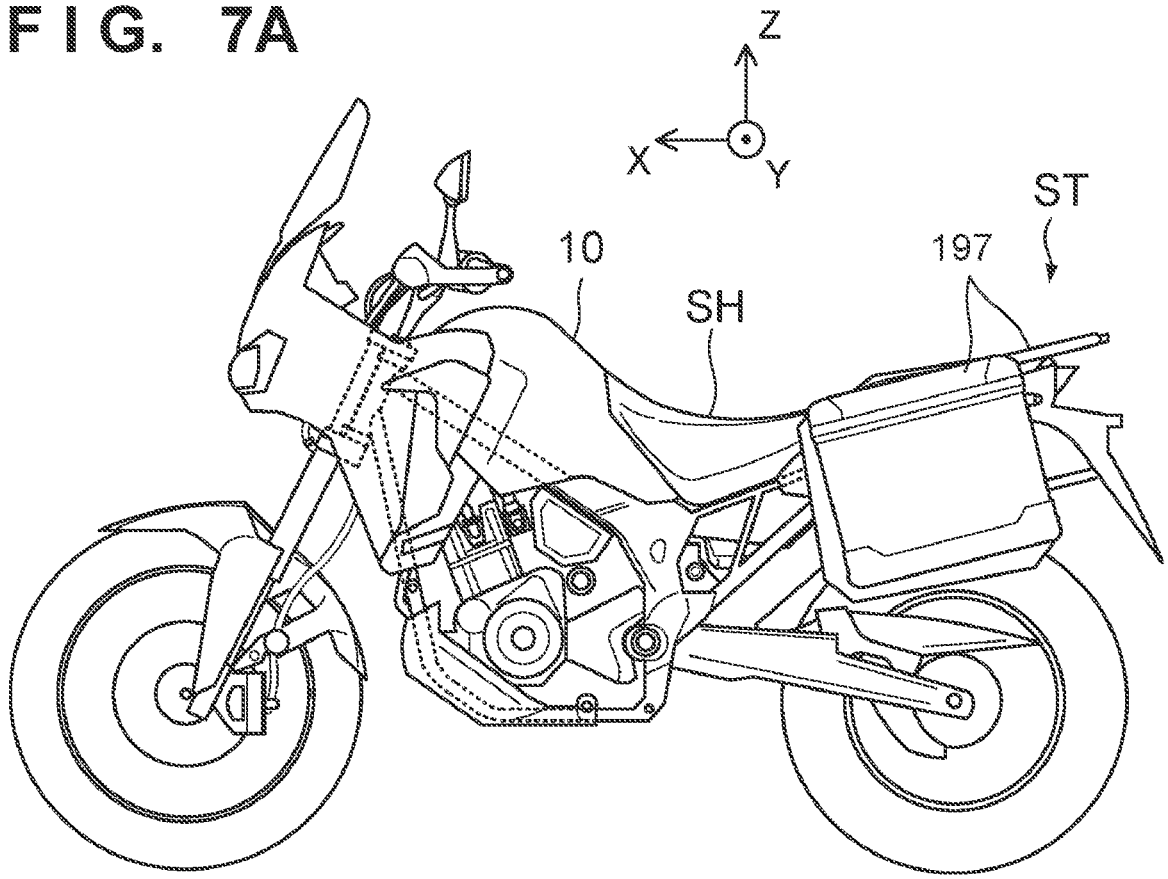
FIG. 7A is a view for explaining another example of the arrangement of the straddle type vehicle.
Figure 7B:
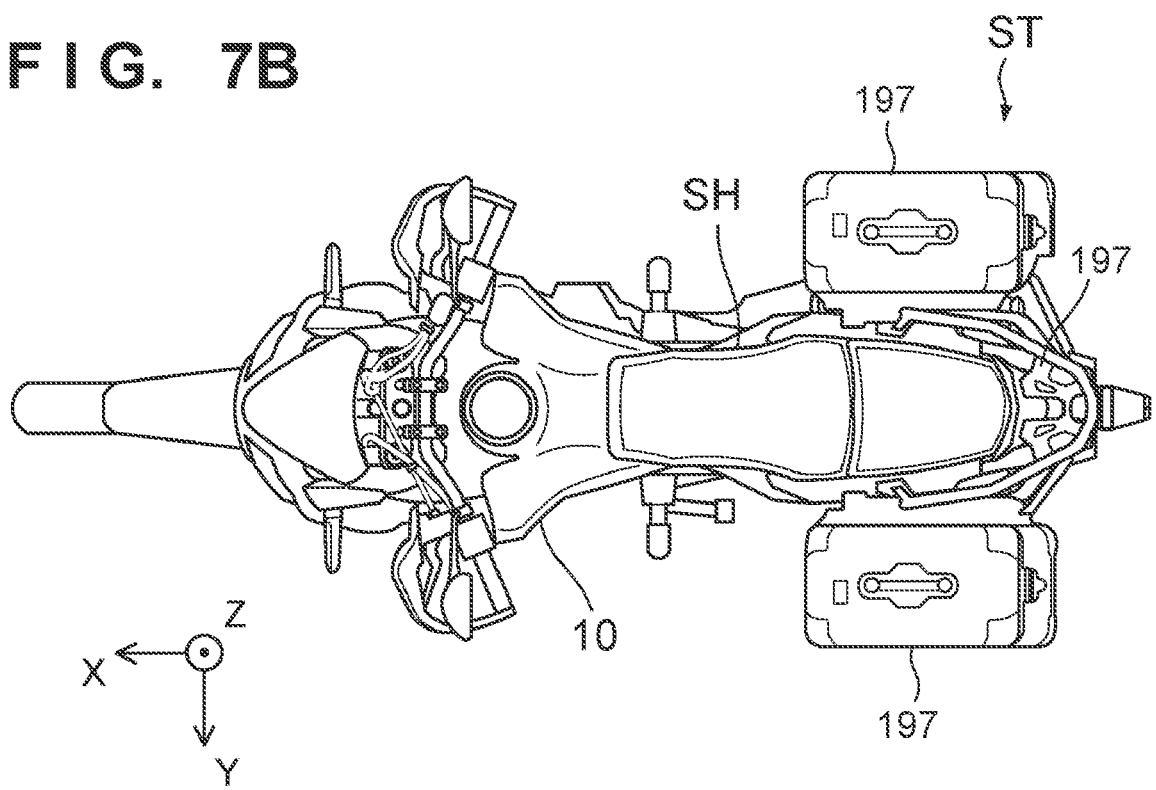
FIG. 7B is a view for explaining another example of the arrangement of the straddle type vehicle.

As another aspect, as shown in FIGS. 7A and 7B, carriers 197 may be fixed to the straddle type vehicle 1. Here, the carrier 197 includes a storage unit that stores a baggage or the like and, additionally, an attachment portion that attaches the storage unit to the vehicle body. FIG. 7A is a right side view of the straddle type vehicle 1 further including the carrier 197, and FIG. 7B shows a top view of the straddle type vehicle 1. The carriers 197 are provided to fix a pair of storage units to both sides of the vehicle body. The carriers 197 are preferably made of a resin, and this makes it possible to suppress an influence on the detection performance and detection accuracy of the radars 171 and suppress an influence on the communication performance of the external communication antenna 18.

Due to the same reason as the carriers 197, the grab rail 196 (see FIG. 2) is also preferably made of a resin. However, the curved shape of the grab rail 196 or a shape in which the diameter or thickness changes may affect the detection performance and detection accuracy of the radars 171. Hence, the radars 171 are preferably fixed at positions shifted from the grab rail 196 in the vertical direction of the vehicle body not to overlap the grab rail 196 from the viewpoint in the horizontal direction. In this embodiment, the radars 171 are fixed at positions on the lower side of the grab rail 196. The grab rail 196 is thus located outside the direction ranges DR of the radars 171, and the detection performance and detection accuracy of the radars 171 improve.

As described above, according to this embodiment, the straddle type vehicle 1 includes the radars 171 as a part of the monitoring device 17, and the rear fender 16 includes the sensor support member 162 configured to support one (radar $171_L$) of the pair of radars 171 on the left side of the vehicle body and the other (radar $171_R$) on the right side of the vehicle body. The pair of radars 171 are thus installed on both sides of the sensor support member 162, and it is possible to appropriately monitor the traveling environment behind the vehicle body while reducing the influence of other vehicle constituent components on the direction ranges DR. According to this installation aspect, the radars 171 are not arranged to unnecessarily extend from the vehicle body 10, and it can be said that this is advantageous in improving designability. Note that in this embodiment, the radars 171 have been shown as a part of the monitoring device 17, and this also applies to another driving support sensor such as a camera, a LiDAR, or a sonar.

Several preferred embodiments have been direction above. However, the present invention is not limited to these examples, and a partial change or a combination can be made within the scope of the present invention. In addition, individual terms described in this specification are merely used for the purpose of explaining the present invention, and the present invention is not limited to the strict meanings of the terms, as a matter of course, and can also incorporate their equivalents.

For example, the straddle type vehicle indicates a type that a driver rides while straddling the vehicle body, and the concept includes not only a motorcycle (including a scooter-type vehicle) but also a three-wheeled vehicle (a vehicle with one front wheel and two rear wheels or a vehicle with two front wheels and one rear wheel), an all terrain vehicle (ATV) such as a four-wheeled buggy, and the like.

The features of the above-described embodiment will be summarized below.

The first aspect is related to a straddle type vehicle (for example, 1), and the straddle type vehicle is a straddle type vehicle comprising a rear fender (for example, 16) arranged on an upper side of a rear wheel (for example, RW), and a monitoring device (for example, 17) configured to monitor a traveling environment on the periphery of a vehicle, wherein the monitoring device includes a pair of sensors (for example, 171), and the rear fender includes a sensor support member (for example, 162) configured to support one of the pair of sensors on a left side of a vehicle body and the other on a right side of the vehicle body.

According to the first aspect, in the vehicle body rear structure, the pair of sensors are arranged on the left side of the vehicle body and on the right side of the vehicle body, thereby appropriately monitoring the traveling environment behind the vehicle body while reducing the influence of other vehicle constituent components on the direction ranges. Note that examples of the sensors are driving support sensors such as a radar (millimeter wave radar), a camera (CCD/CMOS image sensor), a LiDAR (laser radar), and a sonar (ultrasonic sensor). In the embodiment, a radar that is readily affected by a vehicle constituent component has been exemplified, and this also applies to another driving support sensor.

In the second aspect, the pair of sensors comprise radars (for example, 171), and the rear fender is substantially made of a resin.

A millimeter wave emitted by the radar that is an example of the driving support sensor can pass a resin member. Hence, according to the second aspect, detection by the radars is not impeded.

In the third aspect, the pair of sensors comprise radars (for example, 171), and the straddle type vehicle further comprises a grab rail (for example, 196) substantially made of a resin and fixed to a rear portion of the vehicle body.

According to the third aspect, even in the arrangement including the grab rail, detection by the radars is not impeded.

In the fourth aspect, the radars are fixed at positions on a lower side of the grab rail.

According to the fourth aspect, the influence of the grab rail on the detection performance and detection accuracy of the radars is suppressed.

In the fifth aspect, the pair of sensors comprise radars (for example, 171), and the straddle type vehicle further comprises a carrier (for example, 197) substantially made of a resin and fixed to the rear portion of the vehicle body.

According to the fifth aspect, even in the arrangement including the carrier, detection by the radars is not impeded.

In the sixth aspect, the straddle type vehicle further comprises a rear fender stay (for example, 194) fixed to a rear portion of a vehicle body frame (for example, 12) and configured to support the rear fender, wherein the pair of sensors are arranged on the rear side of the rear fender stay.

According to the sixth aspect, the sensors can appropriately be arranged relatively on the rear side of the vehicle body.

In the seventh aspect, the pair of sensors are fixed in a posture in which parts of direction ranges overlap on the rear side of the vehicle body.

According to the seventh aspect, it is possible to appropriately monitor the traveling environment behind the vehicle body without forming a blind spot in the range of monitoring by the sensors behind the vehicle body.

In the eighth aspect, the pair of sensors comprise radars and are fixed such that a license plate (for example, 193) arranged on a lower side of the pair of sensors is not located in the direction ranges.

According to the eighth aspect, since the license plate is typically made of a metal, the radars can appropriately monitor the traveling environment behind the vehicle body without being affected by the existence of the license plate.

In the ninth aspect, the straddle type vehicle further comprises an external communication antenna (for example, 18), wherein the external communication antenna is located between the pair of sensors in a planar view.

According to the ninth aspect, it is possible to appropriately arrange the external communication antenna while suppressing an electromagnetic interference with the sensors.

In the 10th aspect, the sensor support member includes a pair of left and right side wall portions (for example, $1621_L$ and $1621_R$), and a bottom wall portion (for example, 1622) configured to connect the pair of left and right side wall portions, and the pair of sensors are arranged along the pair of left and right side wall portions on the bottom wall portion.

According to the 10th aspect, it is possible to appropriately fix the pair of sensors.

In the 11th aspect, the straddle type vehicle further comprises an external communication antenna (for example, 18), wherein the sensor support member further includes an upper wall portion (for example, 1624) located between the pair of left and right side wall portions in a planar view, and the external communication antenna is fixed to the upper wall portion.

According to the 11th aspect, it is possible to appropriately fix the external communication antenna as well.

In the 12th aspect, the rear fender further includes a cover member (for example, 161) fixed to the rear portion of the vehicle body via the sensor support member, and the cover member covers the sensor support member such that the pair of sensors overlap both the sensor support member and the cover member in a side view.

According to the 12th aspect, it is possible to protect the driving support sensor from an external impact.

The present invention is not limited to the above embodiments and various changes and modifications can be made within the spirit and scope of the present invention. Therefore, to apprise the public of the scope of the present invention, the following claims are made.

What is claimed is:

1. A straddle type vehicle comprising a rear fender arranged on an upper side of a rear wheel, and a monitoring device configured to monitor a traveling environment on the periphery of the vehicle, wherein
    the monitoring device includes a pair of sensors,
    the rear fender includes a sensor support member configured to support one of the pair of sensors on a left side of a vehicle body and the other on a right side of the vehicle body,
    the sensor support member includes a pair of left and right side wall portions, and a bottom wall portion configured to connect the pair of left and right side wall portions, and
    the pair of sensors are arranged along the pair of left and right side wall portions on the bottom wall portion.

2. The straddle type vehicle according to claim 1, wherein the pair of sensors comprise radars, and
    the rear fender is substantially made of a resin.

3. The straddle type vehicle according to claim 1, wherein the pair of sensors comprise radars, and
    the straddle type vehicle further comprises a grab rail substantially made of a resin and fixed to a rear portion of the vehicle body.

4. The straddle type vehicle according to claim 3, wherein the radars are fixed at positions on a lower side of the grab rail.

5. The straddle type vehicle according to claim 1, wherein the pair of sensors comprise radars, and
    the straddle type vehicle further comprises a carrier substantially made of a resin and fixed to a rear portion of the vehicle body.

6. The straddle type vehicle according to claim 1, further comprising a rear fender stay fixed to a rear portion of a vehicle body frame and configured to support the rear fender,
    wherein the pair of sensors are arranged to a vehicle rear side of the rear fender stay.

7. The straddle type vehicle according to claim 1, wherein the pair of sensors are fixed in a posture in which parts of direction ranges overlap on a rear side of the vehicle body.

8. The straddle type vehicle according to claim 7, wherein the pair of sensors comprise radars and are fixed such that a license plate arranged on a lower side of the pair of sensors is not located in the direction ranges.

9. The straddle type vehicle according to claim 1, further comprising an external communication antenna,
    wherein the external communication antenna is located between the pair of sensors in a planar view.

10. The straddle type vehicle according to claim 9,
    wherein the sensor support member further includes an upper wall portion located between the pair of left and right side wall portions in a planar view, and
    the external communication antenna is fixed to the upper wall portion.

11. A straddle type vehicle comprising a rear fender arranged on an upper side of a rear wheel, and a monitoring device configured to monitor a traveling environment on the periphery of the vehicle, wherein
    the monitoring device includes a pair of sensors,
    the rear fender includes a sensor support member configured to support one of the pair of sensors on a left side of a vehicle body and the other on a right side of the vehicle body,
    a rear fender further includes a cover member fixed to the rear portion of the vehicle body via the sensor support member, and
    the cover member covers the sensor support member such that the pair of sensors overlap both the sensor support member and the cover member in a side view.

12. The straddle type vehicle according to claim 11, wherein the pair of sensors comprise radars, and
    the rear fender is substantially made of a resin.

13. The straddle type vehicle according to claim 11, wherein the pair of sensors comprise radars, and
    the straddle type vehicle further comprises a grab rail substantially made of a resin and fixed to a rear portion of the vehicle body.

14. The straddle type vehicle according to claim 13, wherein the radars are fixed at positions on a lower side of the grab rail.

15. The straddle type vehicle according to claim 11, wherein the pair of sensors comprise radars, and
    the straddle type vehicle further comprises a carrier substantially made of a resin and fixed to the rear portion of the vehicle body.

16. The straddle type vehicle according to claim 11, further comprising a rear fender stay fixed to a rear portion of a vehicle body frame and configured to support the rear fender,
    wherein the pair of sensors are arranged to a vehicle rear side of the rear fender stay.

17. The straddle type vehicle according to claim 11, wherein the pair of sensors are fixed in a posture in which parts of direction ranges overlap on a rear side of the vehicle body.

18. The straddle type vehicle according to claim 17, wherein the pair of sensors comprise radars and are fixed such that a license plate arranged on a lower side of the pair of sensors is not located in the direction ranges.

19. The straddle type vehicle according to claim 11, further comprising an external communication antenna,
wherein the external communication antenna is located between the pair of sensors in a planar view.

20. The straddle type vehicle according to claim 19,
wherein the sensor support member further includes an upper wall portion located between a pair of left and right side wall portions in a planar view, and
the external communication antenna is fixed to the upper wall portion.

* * * * *